(12) United States Patent
Gourlay

(10) Patent No.: US 7,062,560 B1
(45) Date of Patent: Jun. 13, 2006

(54) METHOD AND APPARATUS FOR COMMUNICATING HOT OBJECTS OF A SERVER TO THE SERVER'S LOAD BALANCER

(75) Inventor: Douglas Gourlay, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 10/941,271

(22) Filed: Sep. 14, 2004

Related U.S. Application Data

(63) Continuation of application No. 09/675,261, filed on Sep. 28, 2000, now Pat. No. 6,820,123.

(51) Int. Cl.
G06F 15/173 (2006.01)

(52) U.S. Cl. .................... 709/226; 709/203; 718/105; 455/403

(58) Field of Classification Search ............... 709/203, 709/223–226; 718/105
See application file for complete search history.

(56) References Cited

U.S. PATENT DOCUMENTS

| | | | |
|---|---|---|---|
| 5,014,265 A | 5/1991 | Hahne et al. ............... 370/60 |
| 5,280,470 A | 1/1994 | Buhrke et al. ............. 370/13 |
| 5,313,454 A | 5/1994 | Bustini et al. ............. 370/13 |
| 5,339,311 A | 8/1994 | Turner ....................... 370/60 |
| 5,359,592 A | 10/1994 | Corbalis et al. ............ 370/17 |
| 5,485,455 A | 1/1996 | Dobbins et al. ............ 370/60 |
| 5,570,360 A | 10/1996 | Klausmeier et al. ........ 370/60 |
| 5,610,910 A | 3/1997 | Focsaneanu et al. ........ 370/351 |
| 5,666,353 A | 9/1997 | Klausmeier et al. ........ 370/230 |
| 5,715,394 A | 2/1998 | Jabs ........................ 395/200.11 |
| 5,812,529 A | 9/1998 | Czarnik et al. ............. 370/245 |
| 5,922,051 A | 7/1999 | Sidey ......................... 709/223 |
| 6,185,601 B1 * | 2/2001 | Wolff ......................... 709/203 |
| 6,266,523 B1 * | 7/2001 | Cook et al. ................. 455/403 |
| 6,314,465 B1 * | 11/2001 | Paul et al. .................. 709/226 |
| 6,466,980 B1 * | 10/2002 | Lumelsky et al. .......... 709/226 |

OTHER PUBLICATIONS

Chowdhury, Shyamal, "Alternative Bandwidth Allocation Algorithms for Packet Video in ATM Networks", 1992, IEEE, pp. 1061-1068.

* cited by examiner

*Primary Examiner*—Wen-Tai Lin
(74) *Attorney, Agent, or Firm*—Thelen Reid & Priest LLP; Marc S. Hanish

(57) ABSTRACT

More effective load balancing by a Server Load Balancer may be achieved by implementing extended Server Load Balancing information in a server. The extended Server Load Balancing information includes a special listing of "hot" objects, or objects that have been designated for special handling by the Server Load Balancer. In order to determine which objects on a server are "hot" at any particular point in time, the available throughput for the server is determined. This is then multiplied by a "hotness" percentage, resulting in an Object Threshold Value (OTV). Each of N objects is then assigned an Object Request Value (ORV), the N objects determined by taking the N objects utilizing the most bandwidth. The ORVs are then compared with the OTV, and any of the objects whose ORV exceeds the OTV are labeled as "hot". Finally, information on the "hot" objects is communicated to the Server Load Balancer (SLB) for special handling.

50 Claims, 3 Drawing Sheets

```
                 200                      202                      204   206              208   210
                   \                        \                        /    /                  /    /
         gateway.iso.com -- [10/MAY/1999:00:10:30 -000] "GET /inter.html HTTP/1.1" 200 10000
         gateway.iso.com -- [10/MAY/1999:00:10:30 -000] "GET /mauve.gif HTTP/1.1" 200 400
         secum.net       -- [10/MAY/1999:00:10:30 -000] "GET /mauve.gif HTTP/1.1" 200 400
         oleander.com    -- [10/MAY/1999:00:10:30 -000] "GET /mauve.gif HTTP/1.1" 200 400
         oleander.com    -- [10/MAY/1999:00:10:30 -000] "GET /white.gif HTTP/1.1" 200 6000
         oleander.com    -- [10/MAY/1999:00:10:30 -000] "GET /blue.gif HTTP/1.1" 200 6000
         gateway.spa.com -- [10/MAY/1999:00:10:30 -000] "GET /blue.gif HTTP/1.1" 200 6000
         gateway.spa.com -- [10/MAY/1999:00:10:30 -000] "GET /mauve.gif HTTP/1.1" 200 400
         gateway.spa.com -- [10/MAY/1999:00:10:30 -000] "GET /sample.html HTTP/1.1" 200 6000
         gateway.spa.com -- [10/MAY/1999:00:10:30 -000] "GET /cold.jpg HTTP/1.1" 200 12000
         gateway.spa.com -- [10/MAY/1999:00:10:30 -000] "GET /inter.html HTTP/1.1" 200 10000
         gateway.spa.com -- [10/MAY/1999:00:10:30 -000] "GET /colf.jpg HTTP/1.1" 200 5000
         gateway.spa.com -- [10/MAY/1999:00:10:30 -000] "GET /cole.jpg HTTP/1.1" 200 5500
```

*FIG. 2*

```
             300          302
               \           /
             inter.html   20000
             blue.gif     12000
             cold.jpg     12000
             white.gif     6000
             sample.html   6000
             cole.jpg      5500
             colf.jpg      5000
             mauve.gif     1600
```

*FIG. 3*

METHOD AND APPARATUS FOR COMMUNICATING HOT OBJECTS OF A SERVER TO THE SERVER'S LOAD BALANCER

CROSS-REFERENCE TO RELATED APPLICATION

This application claims priority based on parent application Ser. No. 09/675,261, entitled "EXTENSION FOR A DYNAMIC FEEDBACK PROTOCOL" by Douglas Gourlay, filed on Sep. 28, 2000 new patent U.S. Pat. No. 6,820,123.

BACKGROUND OF THE INVENTION

1. Field of the Invention

The present invention relates to the field of network communications. More specifically, the present invention relates to extending the information provided to a Server Load Balancer via a dynamic feedback protocol in order to provide more efficient load balancing.

2. The Background

Server load balancing devices (SLBs) are commonly used in computer networks to distribute a load among multiple servers. The Dynamic Feedback Protocol (DFP) was created to permit monitoring of the individual servers' loads and communication of the current loads to the SLB so that the SLB could evenly distribute a load among the multiple servers.

In DFP, a vector is created by each server, the vector containing the current total server load. This vector is then communicated via the semi-secure DFP to the SLB. Thus, under high traffic conditions, an SLB can remove busy servers from the pool of available servers.

One major drawback, however, of this system is that it limits the SLB to performing rather simplistic load balancing. By communicating only the total server load to the SLB, the SLB really only has three choices as to how to handle a busy server: it can stop sending it traffic entirely, it can (more drastically) send all traffic back to its origin until the server is freed up, or it can reduce the overall load sent to the server.

What is needed is a solution which permits an SLB to perform more complex, and more efficient, load balancing than was available in the prior art.

SUMMARY OF THE INVENTION

More effective load balancing by a Server Load Balancer may be achieved by implementing extended Server Load Balancing information in a server. The extended Server Load Balancing information includes a special listing of "hot" objects, or objects that have been designated for special handling by the Server Load Balancer. In order to determine which objects on a server are "hot" at any particular point in time, the available throughput for the server is determined. This is then multiplied by a "hotness" percentage, resulting in an Object Threshold Value (OTV). Each of N objects is then assigned an Object Request Value (ORV), the N objects determined by taking the N objects utilizing the most bandwidth. The ORVs are then compared with the OTV, and any of the objects whose ORV exceeds the OTV are labeled as "hot". Finally, information on the "hot" objects is communicated to the Server Load Balancer (SLB) for special handling.

BRIEF DESCRIPTION OF THE DRAWINGS

FIG. 2 is an example of a log file in accordance with a specific embodiment of the present invention FIG. 3 is a diagram illustrating the results of parsing a log file in accordance with a specific embodiment of the present invention.

DETAILED DESCRIPTION OF A PREFERRED EMBODIMENT

Figure 1:
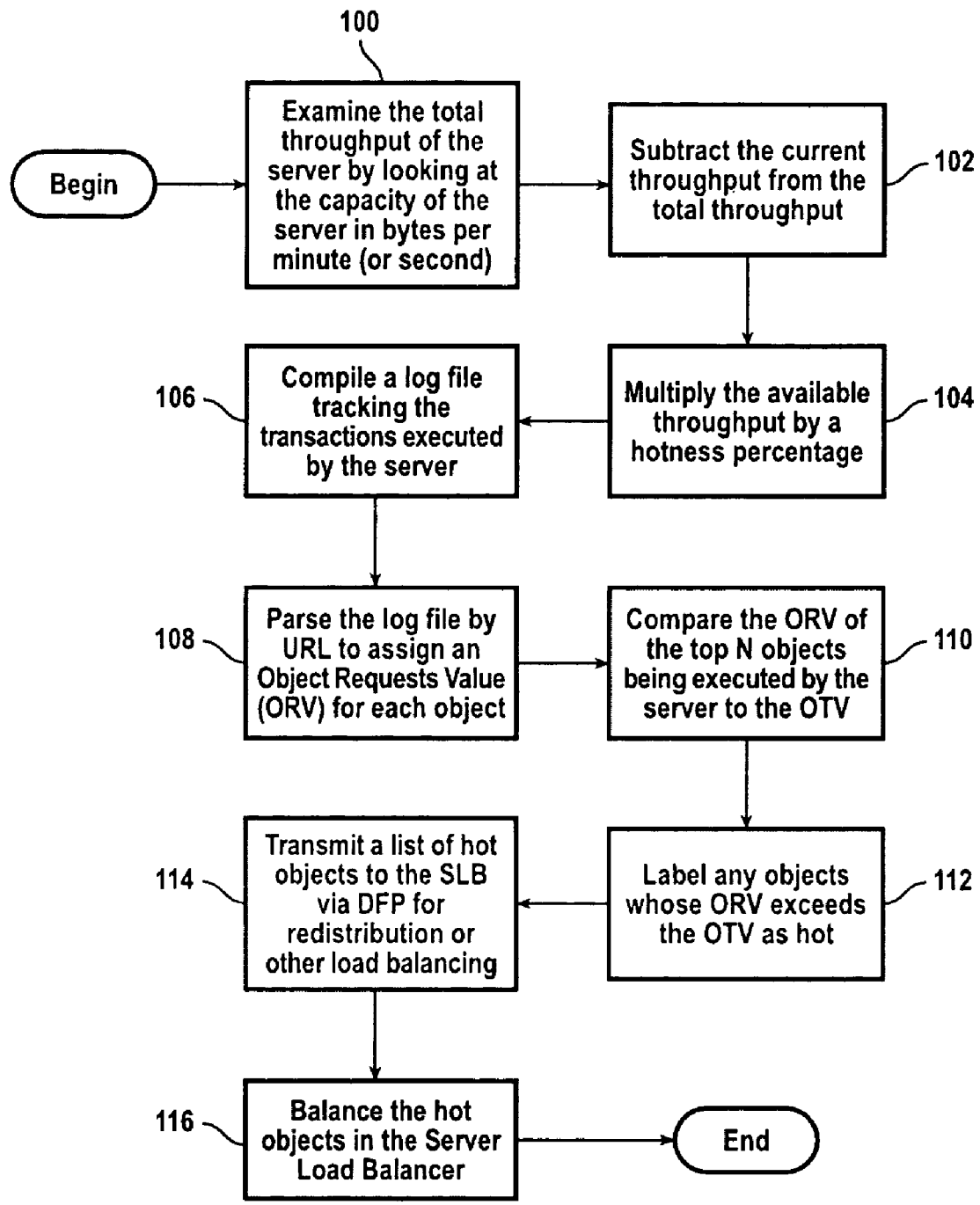
FIG. 1 is a flow diagram illustrating a method for providing extended Server Load Balancing information on a server in accordance with a specific embodiment of the present invention.

In the following description, a preferred embodiment of the invention is described with regard to preferred process steps and data structures. However, those skilled in the art will recognize, after perusal of this application, that embodiments of the invention may be implemented using at least one general purpose computer operating under program control and/or using a program storage device, and that modification of the general purpose computer to implement the components, process steps, and/or data structures described herein would not require undue invention.

In accordance with a specific embodiment of the present invention, the components, process steps, and/or data structures are implemented using software. This implementation is not intended to be limiting in any way. Different implementations may be used and may include other types of operating systems, computing platforms, and/or computer programs. In addition, those of ordinary skill in the art will readily recognize that devices of a less general purpose nature, such as hardwired devices, devices relying on FPGA (field programmable gate array) or ASIC (application specific integrated circuit) technology, or the like, may also be used without departing from the scope and spirit of the inventive concepts disclosed herewith.

The present invention measures and communicates how much of the free resources individual objects utilize, thus allowing a SLB to balance resources on a per object basis. By looking at the overall performance capacity of a server and examining the percentage of remaining resources that are being consumed by the top N objects, certain objects may then be labeled as "hot" and handled by the SLB to help remedy traffic concerns.

A log file tracking the transactions executed by a server is compiled. This log file is then parsed by object, arriving at an Object Requests Value (ORV), which may be measured in bytes per minute. It may also be measured in bytes per second. Then the total throughput of the server is examined by looking at the capacity of the server in bytes per minute (or second). In order to arrive at a value indicating the remaining available throughput on the server, the current throughput is subtracted from the total throughput. The available throughput may then be multiplied by a "hotness percentage". The result is an Object Threshold Value (OTV). The ORV of the top N objects being executed by the server may then be compared to this OTV. Any objects whose ORV exceeds the OTV are defined as "hot". This information may then be communicated to the SLB via DFP. This may be accomplished in several ways. First, the URL of each object may be included as part of a payload field in a DFP packet.

Second, the URL of each object may be encoded in a 3-way 80-bit hash on a 32/32/16 split and then included as part of the payload field in the DFP packet. Third, the DFP packet may point to an XML page on the cache that is then parsed by the SLB and includes a list of the objects. Other implementations are possible as well.

At 106, a log file tracking the transactions executed by a server is compiled. The format of this log file may vary. In a specific embodiment of the present invention, the log file tracks transactions by Uniform Resource Locator (URL) More generically, embodiments are possible that track any object, not just URLs. At 108, the log file is parsed by URL to assign an Object Requests Value (ORV) for each object, which may be measured in bytes per minute. In an alternative embodiment, it may be measured in bytes per second. Thus, the ORV for an object indicates the number of bytes related to that object transferred per minute.

At 110, the ORV of the top N objects being executed by the server may then be compared to the OTV, wherein N is an integer. N, like the hotness percentage, may be set by a network administrator. At 112, any objects whose ORV exceeds the OTV are labeled as hot. At 114, a list of the hot objects may be transmitted to the SLB via DFP for redistribution or other load balancing. This may be performed by including an identifier for each hot object as part of a payload field in a DFP packet. The identifier may be encoded in a 3-way 80-bit hash on a 32/32/16 split. The identifier may be a URL. The communication may also be performed by including a pointer in a payload field in a DFP packet, the pointer pointing to an XML page that includes a list of the objects.

At 116, the SLB load balances the hot objects. In one embodiment of the present invention, the hot object is moved to another server that has more free resources. In another embodiment of the present invention, the hot object is moved to Random Access The SLB may then choose to handle the "hot" objects in various ways. A hot object may simply be moved to another server. It may be moved to RAM on the SLB platform. It may be moved to a Storage Area Network. The SLB may also relocate the object to a caching server cluster more capable of serving the object.

FIG. 1 is a flow diagram illustrating a method for providing extended Server Load Balancing information on a server in accordance with a specific embodiment of the present invention.

At 100, the total throughput of the server is examined by looking at the capacity of the server in bytes per minute (or second). This is generally a static number based on the processing speed of the server, however it can sometimes be variable when caching is used frequently. At 102, the current throughput is subtracted from the total throughput, giving the available throughput on the server. At 104, the available throughput is multiplied by a hotness percentage. The hotness percentage may be set by a network administrator based on the level of resources the network administrator wishes for an object to be able to utilize before the SLB acts to redirect the object or otherwise deal with the heavy traffic for that object. In a specific embodiment of the present invention, the hotness percentage is 10%. The result of multiplying the available throughput by the hotness percentage is an Object Threshold Value (OTV).

Memory (RAM) on the SLB platform. In another embodiment of the present invention, the hot object is moved to a Storage Area Network. In another embodiment of the present invention, the SLB relocates the object to a caching server cluster more capable of serving the object.

FIG. 2 is an example of a log file in accordance with a specific embodiment of the present invention. A remote host field 200 indicates the location of the request. A time/date stamp 202 indicates the date and time of the request. A request type field 204 indicates the type of request (Get being the most common). A filename field 206 indicates the file name to be acted upon (in the case of a Get command, this would be the file to retrieve). A status field 208 indicates the status of the request ("200" indicating OK). Finally, a file size field 210 indicates the file size, in bytes, of the file indicated in the filename field. 306. When the log file is parsed, it may be organized by object or URL and indicate the total file size, or bandwidth, used for each object per minute.

FIG. 3 is a diagram illustrating the results of parsing a log file in accordance with a specific embodiment of the present invention. Objects 300 may be sorted by bandwidth used per minute 302, which is the ORV for each object. If the total throughput available on the server is 150,000 bytes per minute, and the current throughput is 68100 bytes, the available throughput is 81,900 bytes. If the hotness percentage is set at 10%, this gives an OTV of 8,190 bytes. If N is set at 5, then examining the top 5 objects yields the result that three of them should be labeled as hot (inter.html, blue.gif, and cold.jpg). This information may then be transmitted to the SLB in order to specially handle these objects.

Figure 4:
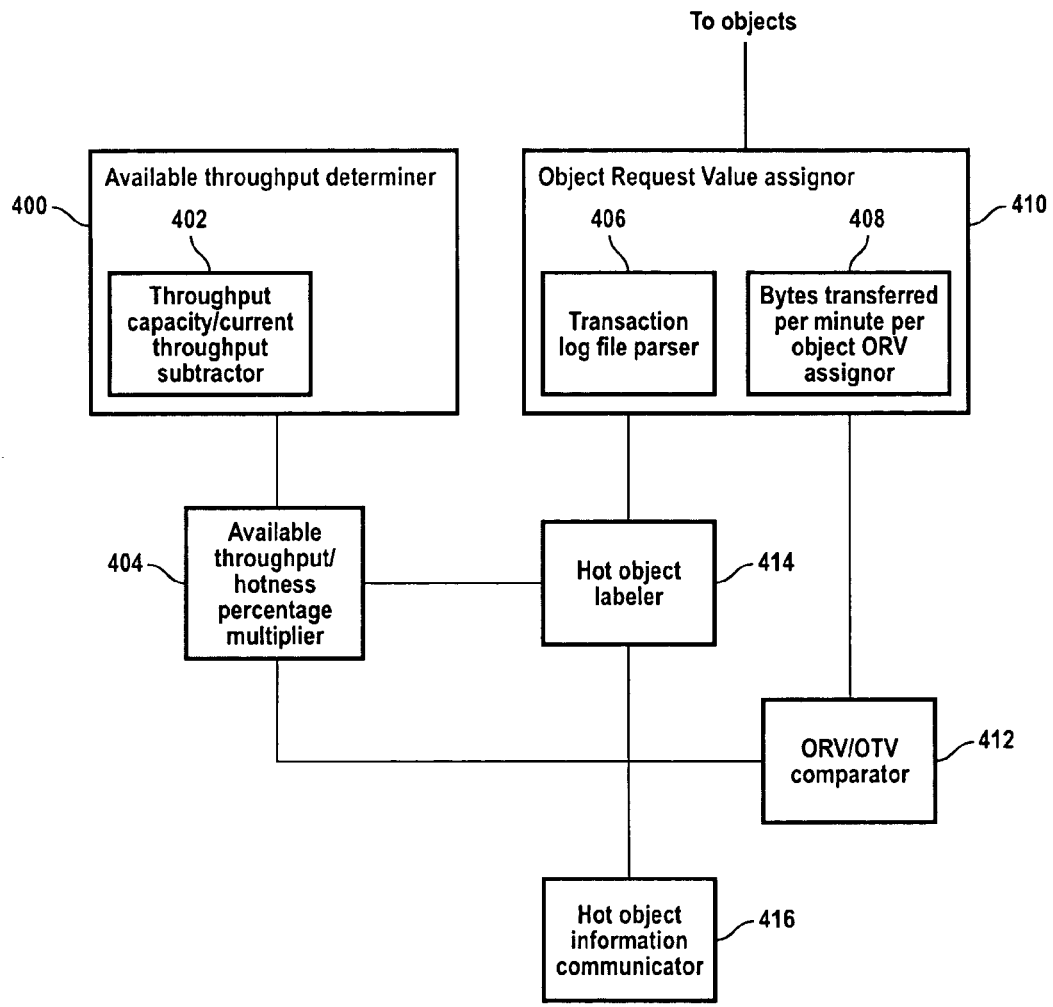
FIG. 4 is a block diagram illustrating an apparatus for providing extended Server Load Balancing information on a server in accordance with a specific embodiment of the present invention.

FIG. 4 is a block diagram illustrating an apparatus for providing extended Server Load Balancing information on a server in accordance with a specific embodiment of the present invention.

An available throughput determiner 400 determines the available throughput for the server. This may be accomplished through the use of a throughput capacity/current throughput subtractor 402, which takes the total throughput of the server (capacity of the server in bytes per minute or second) and subtracting the current throughput from it, giving the available throughput on the server. An available throughput/hotness percentage multiplier 404 coupled to said available throughput determiner 400 multiplies the available throughput by a hotness percentage. The hotness percentage may be set by a network administrator based on the level of resources the network administrator wishes for an object to be able to utilize before the SLB acts to redirect the object or otherwise deal with the heavy traffic for that object. In a specific embodiment of the present invention, the hotness percentage is 10%. The result of multiplying the available throughput by the hotness percentage is an Object Threshold Value (OTV).

A log file tracking the transactions executed by a server is compiled as the server runs. The format of this log file may vary. In a specific embodiment of the present invention, the log file tracks transactions by Uniform Resource Locator (URL). More generically, embodiments are possible that track any object, not just URLs. A transaction log file parser 406 parses the log file is parsed by URL and a bytes transferred per minute per object ORV assignor 408 assigns an Object Requests Value (ORV) for each object, which may be measured in bytes per minute. In an alternative embodiment, it may be measured in bytes per second. Both the transaction log file parser 406 and the bytes transferred per minute per object ORV assignor 408 may be contained in an Object Request Value assignor 410. The ORV for an object indicates the number of bytes related to that object transferred per minute.

An ORV/OTV comparator 412 coupled to the available throughput/hotness percentage multiplier 404 and the Object Request Value assignor 410 compares the ORV of the top N objects being executed by the server to the OTV, wherein N is an integer. N, like the hotness percentage, may be set by a network administrator. A hot object labeler 114 coupled to the available throughput/hotness percentage multiplier 404 and the Object Request Value assignor 410 labels any objects whose ORV exceeds the OTV as hot. A hot object information communicator 416 coupled to the hot object labeler 414 may then transmit a list of the hot objects to the SLB via DFP for redistribution or other load balancing. The hot object information communicator 416 may include a DFP interface (not pictured) for communicating via the DFP protocol. This may act to include an identifier for each hot object as part of a payload field in a DFP packet. An identifier encoder (not pictured) may be coupled to the DFP interface and act to encode each identifier in a 13-way 80-bit hash on a 32/32/16 split. The identifier may be a URL. Alternatively, DFP interface may include a pointer in a payload field in a DFP packet, the pointer pointing to an XML page that includes a list of the objects.

The SLB load balances the hot objects. In one embodiment of the present invention, the hot object is moved to another server that has more free resources. In another embodiment of the present invention, the hot object is moved to Random Access Memory (RAM) on the SLB platform. In another embodiment of the present invention, the hot object is moved to a Storage Area Network. In another embodiment of the present invention, the SLB relocates the object to a caching server cluster more capable of serving the object.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for providing extended Server Load Balancing information on a server in a computer network, wherein said server contains objects, the method including:
   determining an available throughput for the server;
   multiplying said available throughput by a hotness percentage, resulting in an Object Threshold Value (OTV);
   assigning an Object Request Value (ORV) to each of N objects;
   communicating information on one or more of the N objects having an ORV exceeding the OTV to a Server Load Balancer (SLB) for special handling.

2. The method of claim 1, wherein said N objects are determined by taking the N objects utilizing the most bandwidth.

3. The method of claim 1, wherein said N objects are all of the objects.

4. The method of claim 1, wherein said communicating includes communicating information on said objects to an SLB via DFP.

5. The method of claim 4, wherein said communicating further comprises including an identifier for each object as part of a payload field in a DFP packet.

6. The method of claim 5, wherein said communicating further comprises encoding each identifier in a 3-way 80-bit hash on a 32/32/16 split.

7. The method of claim 5, wherein said identifier is a Uniform Resource Locator (URL).

8. The method of claim 6, wherein said identifier is a Uniform Resource Locator (URL).

9. The method of claim 4, wherein said communicating further comprises including a pointer in a payload field in a DFP packet, said pointer pointing to an Extensible Markup Language (XML) page that includes a list of the objects.

10. The method of claim 1, wherein the server has a throughput capacity and a current throughput, and said determining includes subtracting said current throughput from said throughput capacity.

11. The method of claim 1, wherein said hotness percentage is set by a network administrator based on a level of resources said network administrator wishes for an object to be able to utilize before a Server Load Balancer acts to deal with heavy traffic for that object.

12. The method of claim 1, wherein said hotness percentage is 10%.

13. The method of claim 1, wherein said assigning includes:
   parsing a log file tracking transactions executed by a server by object; and
   assigning an Object Request Value (ORV) to each of the objects based on the bytes transferred per minute per object.

14. The method of claim 1, wherein said assigning includes:
   parsing a log file tracking transactions executed by a server by object; and
   assigning an Object Request Value (ORV) to each of the objects based on the bytes transferred per second per object.

15. The method of claim 1, further including comparing the ORV of each object to said OTV.

16. The method of claim 1, wherein said special handling includes moving an object to a different server with more free resources.

17. The method of claim 1, wherein said special handling includes moving an object to Random Access Memory (RAM) on said SLB.

18. The method of claim 1, wherein said special handling includes moving an object to a Storage Area Network.

19. The method of claim 1, wherein said special handling includes relocating an object to a caching server cluster more capable of serving said object.

20. The method of claim 1, wherein N is set by a network administrator and is a positive integer.

21. An apparatus for providing extended Server Load Balancing information on a server in a computer network, wherein said server contains objects, the apparatus including:
   an available throughput determiner;
   an available throughput/hotness percentage multiplier coupled to said available throughput determiner;
   an Object Request Value (ORV) assignor coupled to each of N objects;
   an object information communicator coupled to said ORV assigner, said object information communicator configured to communicate one or more of the N objects having an ORV exceeding an object threshold value to a server load balancer.

22. The apparatus of claim 21, wherein said N objects are determined by taking the N objects utilizing the most bandwidth.

23. The apparatus of claim 21, wherein said N objects are all of the objects.

24. The apparatus of claim 21, wherein said object communicator includes a DFP interface.

25. The apparatus of claim 24, wherein said object communicator further includes an identifier encoder coupled to said DFP interface.

26. The apparatus of claim 21, wherein the server has a throughput capacity and a current throughput, and said available throughput determiner includes a throughput capacity/current throughput subtractor.

27. The apparatus of claim 21, wherein said ORV assignor includes:
a transaction log file parser; and
a bytes transferred per minute per object ORV assignor coupled to said transaction log file parser.

28. The apparatus of claim 21, wherein said ORV assignor includes:
a transaction log file parser; and
a bytes transferred per second per object ORV assignor coupled to said transaction log file parser.

29. The apparatus of claim 21, further including an ORV/OTV comparator coupled to said ORV assignor and to said available throughput/hotness percentage multiplier.

30. A program storage device readable by a machine, tangibly embodying a program of instructions executable by the machine to perform a method for providing extended Server Load Balancing information on a server in a computer network, wherein said server contains objects, the method including:
determining an available throughput for the server;
multiplying said available throughput by a hotness percentage, resulting in an Object Threshold Value (OTV);
assigning an Object Request Value (ORV) to each of N objects;
communicating information on one or more of the N objects having an ORV exceeding the OTV to a Server Load Balancer (SLB) for special handling.

31. An apparatus for providing extended Server Load Balancing information on a server in a computer network, wherein said server contains objects, the apparatus including:
means for determining an available throughput for the server;
means for multiplying said available throughput by a hotness percentage, resulting in an Object Threshold Value (OTV);
means for assigning an Object Request Value (ORV) to each of N objects;
means for communicating information on one or more of the N objects having an ORV exceeding the OTV to a Server Load Balancer (SLB) for special handling.

32. The apparatus of claim 31, wherein said N objects are determined by taking the N objects utilizing the most bandwidth.

33. The apparatus of claim 31, wherein said N objects are all of the objects.

34. The apparatus of claim 31, wherein said means for communicating includes means for communicating information on said objects to an SLB via DFP.

35. The apparatus of claim 34, wherein said means for communicating further comprises means for including an identifier for each hot object as part of a payload field in a DFP packet.

36. The apparatus of claim 35, wherein said means for communicating further comprises means for encoding each identifier in a 3-way 80-bit hash on a 32/32/16 split.

37. The apparatus of claim 35, wherein said identifier is a Uniform Resource Locator (URL).

38. The apparatus of claim 36, wherein said identifier is a Uniform Resource Locator (URL).

39. The apparatus of claim 34, wherein said means for communicating further comprises means for including a pointer in a payload field in a DFP packet, said pointer pointing to an Extensible Markup Language (XML) page that includes a list of the objects.

40. The apparatus of claim 31, wherein the server has a throughput capacity and a current throughput, and said means for determining includes means for subtracting said current throughput from said throughput capacity.

41. The apparatus of claim 31, wherein said hotness percentage is set by a network administrator based on a level of resources said network administrator wishes for an object to be able to utilize before a Server Load Balancer acts to deal with heavy traffic for that object.

42. The apparatus of claim 31, wherein said hotness percentage is 10%.

43. The apparatus of claim 31, wherein said means for assigning includes:
means for parsing a log file tracking transactions executed by a server by object; and
means for assigning an Object Request Value (ORV) to each of the objects based on the bytes transferred per minute per object.

44. The apparatus of claim 31, wherein said means for assigning includes:
means for parsing a log file tracking transactions executed by a server by object; and
means for assigning an Object Request Value (ORV) to each of the objects based on the bytes transferred per second per object.

45. The apparatus of claim 31, further including comparing the ORV of each object to said OTV.

46. The apparatus of claim 31, wherein said special handling includes moving a hot object to a different server with more free resources.

47. The apparatus of claim 31, wherein said special handling includes moving a hot object to Random Access Memory (RAM) on said SLB.

48. The apparatus of claim 31, wherein said special handling includes moving a hot object to a Storage Area Network.

49. The apparatus of claim 31, wherein said special handling includes relocating a hot object to a caching server cluster more capable of serving said hot object.

50. The apparatus of claim 31, wherein N is set by a network administrator and is a positive integer.

* * * * *